United States Patent
Chen et al.

(10) Patent No.: US 8,041,338 B2
(45) Date of Patent: Oct. 18, 2011

(54) MOBILE WALLET AND DIGITAL PAYMENT

(75) Inventors: Yuqun Chen, Seattle, WA (US); Mohammed Moinuddin, Bellevue, WA (US); Yacov Yacobi, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 995 days.

(21) Appl. No.: 11/852,488

(22) Filed: Sep. 10, 2007

(65) Prior Publication Data

US 2009/0068982 A1    Mar. 12, 2009

(51) Int. Cl.
*H04M 11/00* (2006.01)
*H04M 1/66* (2006.01)
*H04W 68/00* (2009.01)
*G06Q 40/00* (2006.01)
*G06Q 20/00* (2006.01)
*G06F 15/16* (2006.01)

(52) U.S. Cl. .......... 455/407; 455/410; 455/558; 705/35; 705/70; 709/227

(58) Field of Classification Search .......... 455/406, 455/407, 408, 411, 410, 456.1, 558; 705/39, 705/44, 72, 76, 53, 70, 71; 709/227, 228, 709/229

See application file for complete search history.

(56) References Cited

U.S. PATENT DOCUMENTS

| | | | |
|---|---|---|---|
| 5,887,266 A * | 3/1999 | Heinonen et al. | 455/558 |
| 6,795,923 B1 * | 9/2004 | Stern et al. | 726/12 |
| 7,069,001 B2 * | 6/2006 | Rupp et al. | 455/411 |
| 7,103,575 B1 * | 9/2006 | Linehan | 705/64 |
| 7,575,177 B2 * | 8/2009 | Killian et al. | 235/492 |
| 7,590,602 B1 * | 9/2009 | Luzzatto | 705/64 |
| 2003/0037074 A1 | 2/2003 | Dwork et al. | |
| 2004/0122685 A1 * | 6/2004 | Bunce | 705/1 |
| 2004/0267665 A1 * | 12/2004 | Nam et al. | 705/41 |
| 2005/0060297 A1 | 3/2005 | Najork | |
| 2005/0161503 A1 | 7/2005 | Remery et al. | |
| 2006/0095416 A1 | 5/2006 | Barkhin et al. | |
| 2007/0033206 A1 | 2/2007 | Laugier et al. | |
| 2007/0063015 A1 * | 3/2007 | Mebruer | 235/379 |
| 2008/0216096 A1 * | 9/2008 | Wang | 719/319 |
| 2009/0036119 A1 * | 2/2009 | Smith et al. | 455/432.1 |

FOREIGN PATENT DOCUMENTS

| | | |
|---|---|---|
| JP | 2002-140649 | 5/2002 |
| KR | 10-2004-0075605 | 8/2004 |
| KR | 10-2005-0019674 | 3/2005 |

(Continued)

OTHER PUBLICATIONS

Yacobi. "Risk Management for E-Cash Systems with Partial Real-Time Audit" in Financial Cryptography (1999), pp. 62-71.

(Continued)

*Primary Examiner* — George Eng
*Assistant Examiner* — Scott Au

(57) ABSTRACT

The claimed subject matter provides a system and/or a method that facilitates securing a wireless digital transaction. A terminal component can receive a portion of data related to a payment for at least one of a good or a service. A mobile device can include at least one mobile payment card (m-card), wherein the m-card is created by establishing a link to an account associated with a form of currency. The mobile device can employ public-key cryptography (PKC) to securely and wirelessly transmit a payment to the terminal component utilizing the m-card and linked account.

17 Claims, 10 Drawing Sheets

FOREIGN PATENT DOCUMENTS

KR  10-2006-0014864  2/2006

OTHER PUBLICATIONS

International Search report and Written Opinion for PCT Application No. PCT/US2008/069491 completed and mailed Jan. 7, 2009, 11 pages.

The Economist: Phoney Finance. Oct. 26, 2006.

E. Haselsteiner, et al. Security in Near Field Communication (NFC), Strengths and Weaknesses. Philips Semiconductors, Mikronweg 1, 8101 Gratkorn. http://events.iaik.tugraz.at/RFIDSec06/Program/papers/002%20-%20Security%20in%20NFC.pdf. Last accessed Dec. 5, 2007, 11 pages.

S. Even, et al. Electronic Wallet. Advances in Cryptography: Proceedings of CRYPTO'83, D. Chaum (ed.), Plenum Press, 1984, pp. 383-386. http://dsns.csie.nctu.edu.tw/research/crypto/HTML/PDF/C83/383.PDF. Last accessed Dec. 5, 2007, 4 pages.

Liz Pulliam Weston. New credit cards allow hands-free theft. MSN Money online edition. http://tinyurl.com/ycugp4.

M. Peinado, et al. NGSCB: A Trusted Open System. The 9th Australasian Conference on Information Security and Privacy, Sydney, Australia, Jul. 13-15, 2004. http://research.microsoft.com/~yuqunc/papers/ngscb.pdf. Last accessed Dec. 5, 2007, 12 pages.

G. Hunt, et al. Broad New OS Research: Challenges and Opportunities. The 10th Workshop on Hot Topics in Operation Systems (USENIX), pp. 85-90. Santa Fe, NM, Jun. 2005. http://research.microsoft.com/os/singularity/publications/hotos2005_broadnewresearch.pdf. Last accessed Dec. 5, 2007, 6 pages.

International Search Report and Written Opinion for PCT Application PCT/US2008/073560, issued Feb. 27, 2009, 11 pages.

\* cited by examiner

MOBILE WALLET AND DIGITAL PAYMENT

BACKGROUND

With the ever-increasing popularity of personal mobile devices, e.g., cell phones, smartphones, personal digital assistants (PDAs), personal music players, laptops, etc., 'mobility' has been the focus of many consumer products as well as services of wireless providers. For example, in the telecommunications industry, 'mobility' is at the forefront, as consumers are no longer restricted by location with regard to communications and computing needs. Rather, today, as technology advances, more and more consumers use portable devices in day-to-day activities, planning and entertainment.

With credit cards and debit cards the world has been moving to becoming cashless society. Consumers are relying predominantly on non-cash based payments: credit card, debit card, automated check processing, pre-paid cards, etc. As the whole society moves towards virtual payments, challenges and opportunities spring up.

As the wallet in consumers pockets moves from the physical to virtual, security surrounding the virtual wallet becomes critical. The payment-processing industry faces three main challenges based on the current market trends such as user identification, fraud, and interchange fee. User identification has been a perennial problem for the industry. For example, how does a store clerk know that the person presenting the card is the actual owner? This problem has become more severe in the eCommerce world as of late.

Fraud is one of the biggest threats to the payment processing industry. There are many forms of fraud that plague the payment industry, which can include the following: Hackers stealing identity of consumers; Stealing card information; Fictitious merchant charging gullible customers more money than the consumers owes for the products and services; or Credit card number generators targeting consumers.

Lastly, interchange fee that merchants pay to get a transaction processed continues to increase consistently. Typically, merchants pay anywhere from 1.5%+10 ¢ per transaction to 2.5%+20 ¢ per transaction. The actual fee can depend on the number of transactions a merchant sends, type of business the merchant does, etc. In light of the above, the payment-processing industry is looking for solutions that can help deal with one or all of the challenges, which can result in lowered cost of processing a transaction and increased customer satisfactions.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate securing a digital payment between a terminal and a mobile device. A mobile payment card (m-card) can be created and stored on a mobile communication device, wherein the m-card can be utilized to for digital wireless payments with a payment terminal. In particular, the m-card can be linked to an account related to, for instance, a bank, a credit card company, a financial institution, etc. The m-card data can be wirelessly transmitted in a secure manner to a payment terminal using public-key cryptography techniques. Once a portion of the m-card is received by the payment terminal, such portion can be verified and/or authenticated by communicating (e.g., using public-key cryptography) with the m-card issuing entity (e.g., a bank, a credit card company, a financial institution, etc.). In general, the mobile device with embedded m-card data as illustrated by the subject innovation can enhance wireless payments in a secure and protected manner. The claimed subject matter provides better user identification, reduces fraud rates, and verifies authenticity of payment terminals and mobile devices.

Moreover, the mobile device can include various security measures and/or techniques to ensure a safe communication with the payment terminal. The mobile device can include a next-generation secure computing base (NGSCB) with a secure boot mechanism and host a virtual machine (VM) environment. In one aspect, the mobile device limits interaction with a keypad and/or a screen on the mobile device to a single virtual machine. In another aspect, the mobile device can employ a password or PIN for security. Furthermore, the mobile device can include a physical input button that can initiate a password entry, a payment, or a password entry completion. In other aspects of the claimed subject matter, methods are provided that facilitate employing a secure payment protocol in connection with a mobile device and a terminal.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
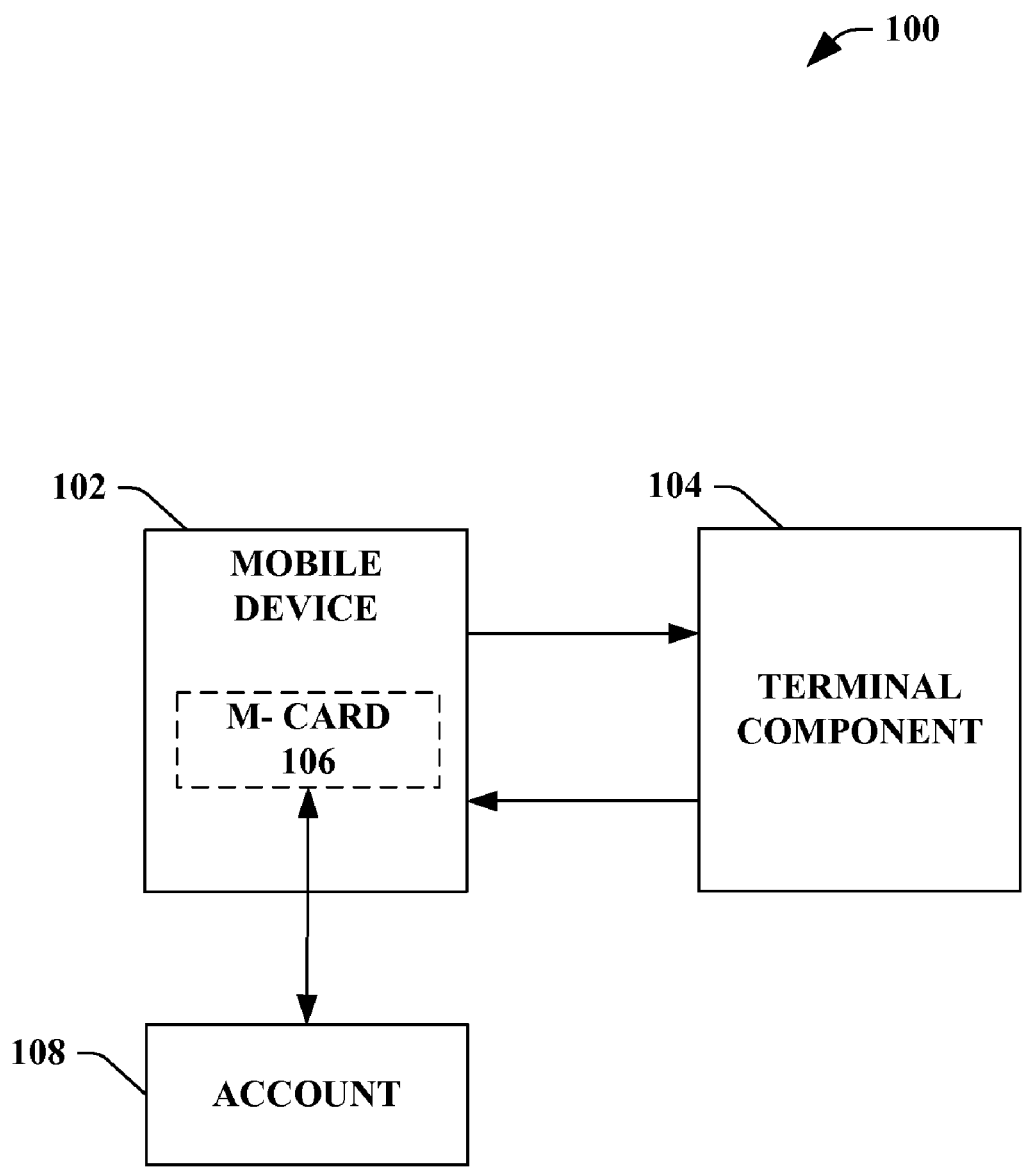
FIG. 1 illustrates a block diagram of an exemplary system that facilitates securing a digital payment between a terminal and a mobile device.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "terminal," "machine," "module," "device," "certificate," "manager," "authority," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates securing a digital payment between a terminal and a mobile device. The system 100 can include a mobile device 102 that can employ a secure and confident wireless payment with a terminal component 104. In particular, the mobile device 102 can implement public-key cryptography (PKC) in connection with communicating a portion of an m-card 106 to the terminal component 104, wherein the m-card 106 can be account information, passwords, personal identification numbers (PINs), personal information, account numbers, routing numbers, and/or any other portion of data related to an account 108. For instance, the terminal component 104 can be any suitable payment terminal or device associated with a merchant or company that can wirelessly communicate a portion of data related to a transaction. Moreover, the mobile device 102 can be any suitable device that can include the m-card 106 and/or communicate wirelessly with the terminal component 104 such as, but not limited to, a handheld, a portable digital assistant, a cellular device, a mobile communication device, a portable media player, a gaming device, a pocket PC, a smartphone, etc. In general, it is to be appreciated that the mobile device 102 can wirelessly interact with the terminal component 104 with public-key cryptography (PKC) so as to authenticate users, reduce fraud rates, and/or verify the terminal component 104.

As indicated, the mobile device 102 can include at least one mobile payment card (herein referred to as the m-card 106). The m-card 106 can be linked to the account 108, wherein the account 108 can include any suitable type or form of currency. For example, the account 108 can include cash, credit, a micro-payment, a pre-paid card, a stored value card, a disposable card, a line of credit, an exchange of a service, an exchange of a good, or a tab. Moreover, it is to be appreciated that the account 108 can be related to a checking account, a savings account, an investment account, a bond, a certificate of deposit (CD), and/or any other suitable account related to monetary value. Thus, the mobile device 102 can incorporate at least one m-card 106 that can be utilized to execute or provide payment for a wireless transaction with the terminal component 104.

For example, a user can store an m-card on a smartphone in which the m-card can be linked to the user's personal checking account. In other words, the smartphone and embedded m-card can include a portion of account information that can be utilized to complete a digital transaction and/or payment. Rather than using a credit card, a check, debit card, and/or any other physical item stored in a bulky wallet, the user can utilize the smartphone and incorporated m-card as a payment option. Thus, at a store or any other location that has a payment terminal (e.g., terminal component 104), the user can securely and wirelessly transmit a portion of data associated with the m-card to the payment terminal for payment for a good or service, wherein such portion of data is secured and protected with public-key cryptography (PKC). By utilizing public-key cryptography (PKC) and an intelligent mobile device (e.g., mobile device 102, a smartphone, etc.), the system 100 can be a secure digital payment system. The system 100 can provide better user identification and reduce fraud rates. The mobile device 12 can further verify authenticity of the terminal component 104 and conduct a secure payment transaction on the user's behalf that increases user confidence in such techniques. Moreover, the system 100 can further reduce account (e.g., bank, credit card, company, etc.) costs, thereby reducing interchange fees.

In addition, the system 100 can include any suitable and/or necessary interface component (not shown), which provides various adapters, connectors, channels, communication paths, etc. to integrate the mobile device 102 into virtually any operating and/or database system(s) and/or with one another. In addition, the interface component can provide various adapters, connectors, channels, communication paths, etc., that provide for interaction with the mobile device 102, terminal component 104, m-card 106, account 108, and any other device and/or component associated with the system 100.

Figure 2:
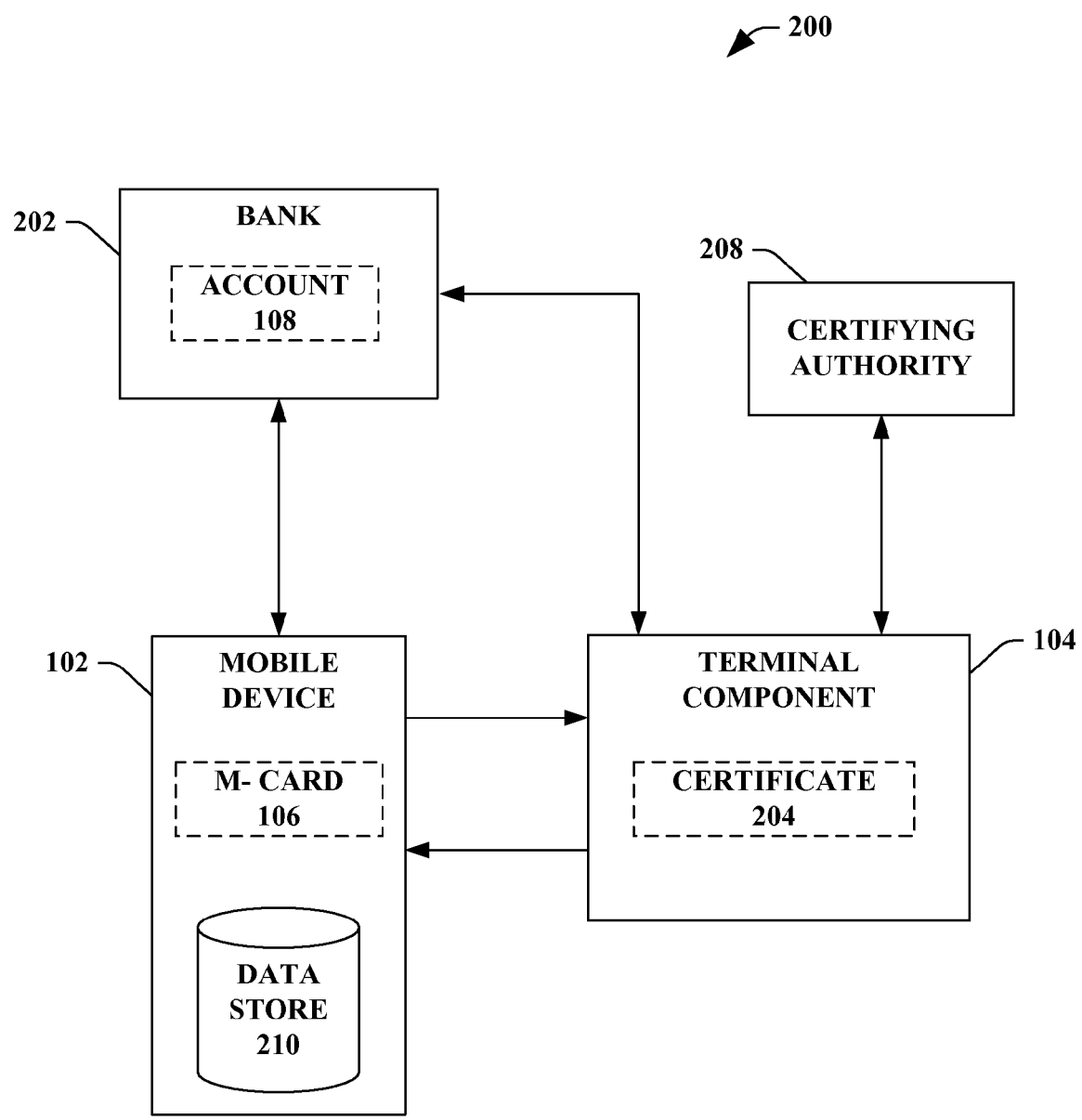
FIG. 2 illustrates a block diagram of an exemplary system that facilitates securing a wireless payment to a terminal with a mobile device.

FIG. 2 illustrates a system 200 that facilitates securing a wireless payment to a terminal with a mobile device. The system 200 can include the mobile device 102 that includes an embedded m-card 106. The m-card 106 can relate to a portion of account information associated with the account 108. In general, the mobile device 102 can utilize the m-card 106 for wireless transactions with the terminal component 104 in a secure manner based upon public-key cryptography (PKC). As depicted, the account 108 can correspond to a bank 202. However, it is to be appreciated that any suitable third-party or financial institution can be connected to the m-card 106 and/or the account 108 such as, but not limited to, a credit card company, a business that issues credit, an online bank, a brick-and-mortar bank, etc. Furthermore, the system 200 can be utilized with credit card-like (CC) transactions, debit cards, prepaid cards, and/or any other suitable digital equivalents thereof.

In the system 100, the following are depicted the mobile device 102, the terminal component 104 (e.g., a merchant's payment terminal), and a bank 202 (e.g., an m-card issuing bank, etc.). The mobile device 102 can hold a number of m-cards (e.g., m-card 106), each of which can be issued by a respective bank (e.g., the bank 202). For example, when conducting a transaction, a user brings the mobile device 102 within a close proximity of (or in actual physical contact with) the terminal component 104 (e.g., the payment terminal). Each transaction can be authorized by the bank 202, which subsumes a traditional role of gateways and clearing houses. It is to be appreciated that a communication layer can be built on top of Near-Field Communication (NFC) or a combination of NFC and Bluetooth. Moreover, security issues related to the communication layer are discussed further below.

It is to be appreciated that an on-line authorization can be utilized for a credit card transaction. In an off-line scenario, an up-to-date digital certificate that accompanies the m-card can be used to convince a merchant that the m-card 106 is valid. The merchant can keep a black list in order to track m-cards that are stolen, reported stolen, or have exceeded account balances/thresholds. Yet, in another example, the mobile device 102 can contact and/or communicate with the bank 202 via a mobile device network (e.g., cellular network, wireless fidelity (Wi-Fi), etc.) (discussed in more detail in FIG. 5).

The system 100 can employ public-key cryptography (PKC) to secure an m-card transaction and prevent various forms of unauthorized uses. The system 100 can illustrate public-key cryptography (PKC) techniques in connection with digital and/or wireless payments in accordance with the subject innovation.

The m-card 106 (M) can be presented by a tuple (N, $K_p$, $K_s$, C), where N (or written as M.N) is an integer number that uniquely identifies the card (e.g., in a simple scheme, the bank 202 can select N≡$K_p$), $K_p$ (or M.$K_p$) and $K_s$ (or M.$K_s$) are the public and secret keys of an RSA key pair (it is to be appreciated that any suitable public-key scheme can be employed). M.C is a certificate that can attest to the validity of M.N and M.$K_p$. This certificate can have a short duration so that in the off-line case, a stale m-card can be detected and declined by the merchant. The bank can push a new certificate to the mobile device 102 within a transaction, by, for instance, tunneling such update (e.g., the new certificate) through the terminal component 104.

When issuing a new m-card, the bank 202 can generate a public key pair ($K_s$, $K_p$), along with a unique number N that can represent the m-card 106. It sends (N, $K_s$) to the mobile device 102 and keeps a record of (N, $K_p$). The user's mobile device 102 can sign each transaction with $K_s$. The merchant's payment terminal (e.g., terminal component 104) or the issuing bank (e.g., the bank 202) can verify the transaction using the public key $K_p$, indexed by N.

Each payment terminal (e.g., the terminal component 104) can authenticate itself to the payer's mobile device using PKC. The terminal component 104 (also referred to as payment terminal T) can be represented by another tuple (N, $K_p$, $K_s$, L, C), where L (or T.L) can be a location of the terminal component 104 and C (or T.C) is a certificate 204 that attests to the authenticity of T.N, T.$K_p$ and T.L. The certificate 204 can be issued by an independent organization such as a certifying authority 208. Moreover, the certificate can have a short expiration time. Since the terminal component 104 can be on-line in order to conduct most transactions, the terminal component 104 can periodically renew the certificate 204 via the certifying authority 208.

Figure 6:
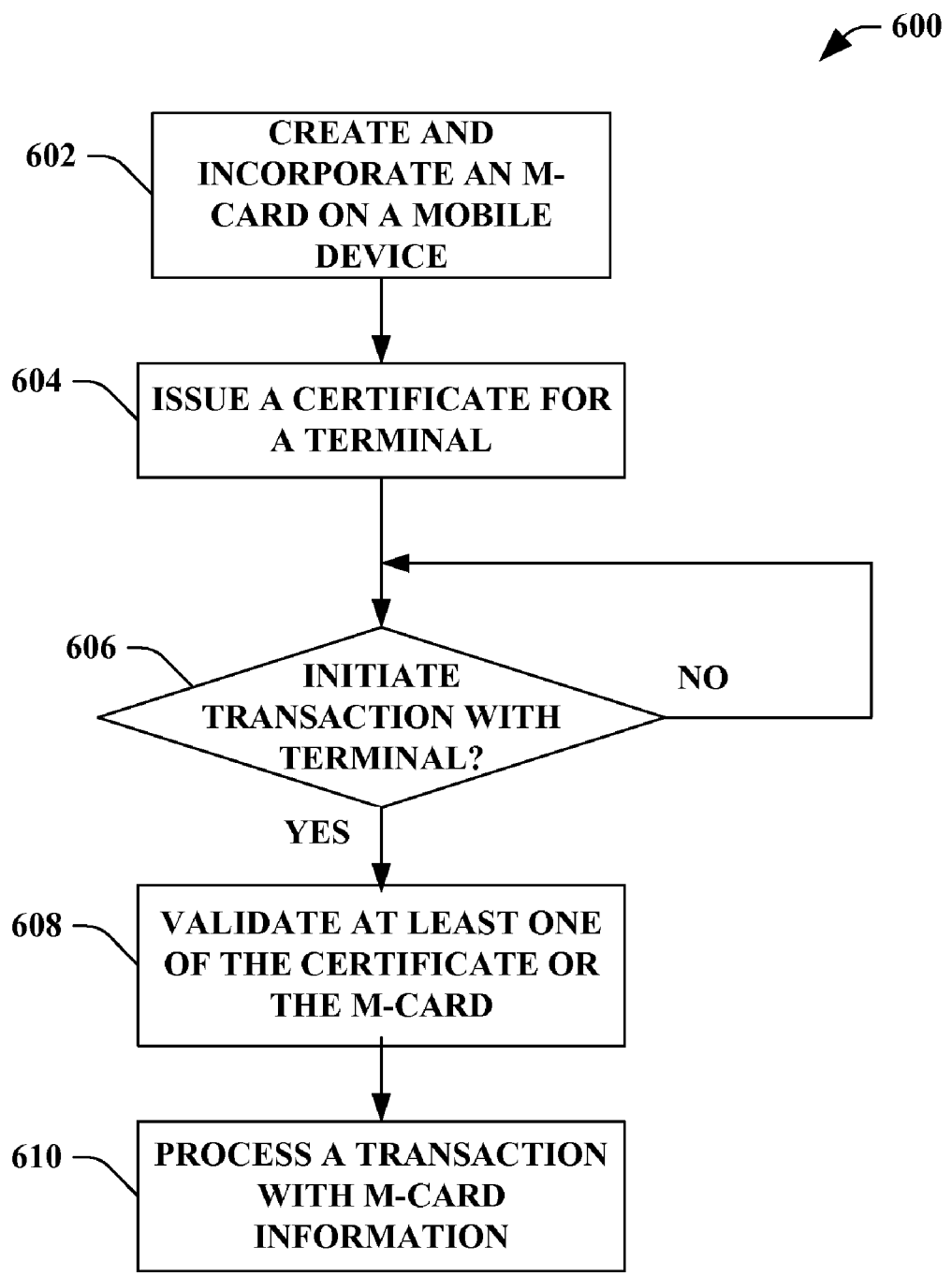
FIG. 6 illustrates an exemplary methodology that facilitates utilizing a mobile device to securely wirelessly transmit account information.

It is to be appreciated that FIG. 6 illustrates more details on payment transactions and/or conducting payment transactions. Moreover, it is to be appreciated that the terminal component 104 can be trusted to not be tampered with, for otherwise the terminal component 104 can withhold a successful transaction and ask the user to authorize again (in effect double-billing the customer). The bank 202 can, for instance and in most cases, catch double-billing fraud. Furthermore, a negative confirmation from the terminal component 104 (e.g., failure of the transaction, rejection of transaction, etc.) can be recorded on the mobile device 102 for future conflict resolution. The recorded information can be particularly useful if such information is signed by the terminal component 104.

Such data (e.g., m-cards, transactional data, account information, user preferences, payment history data, wireless settings, certificates, time stamps for validation, and/or any other suitable data associated with the system 200) can be stored in a data store 210. In general, the data store 210 can include any suitable data related to the mobile device 102, the terminal component 104, the m-card 106, the account 108, the bank 202, the certifying authority 208, the certificate 204, etc.

It is to be appreciated that the data store 210 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 210 of the subject systems and/or methods is intended to comprise, without being limited to, these and any other suitable types of memory. In addition, it is to be appreciated that the data store 210 can be a server, a database, a hard drive, a pen drive, an external hard drive, a portable hard drive, and the like.

Figure 3:
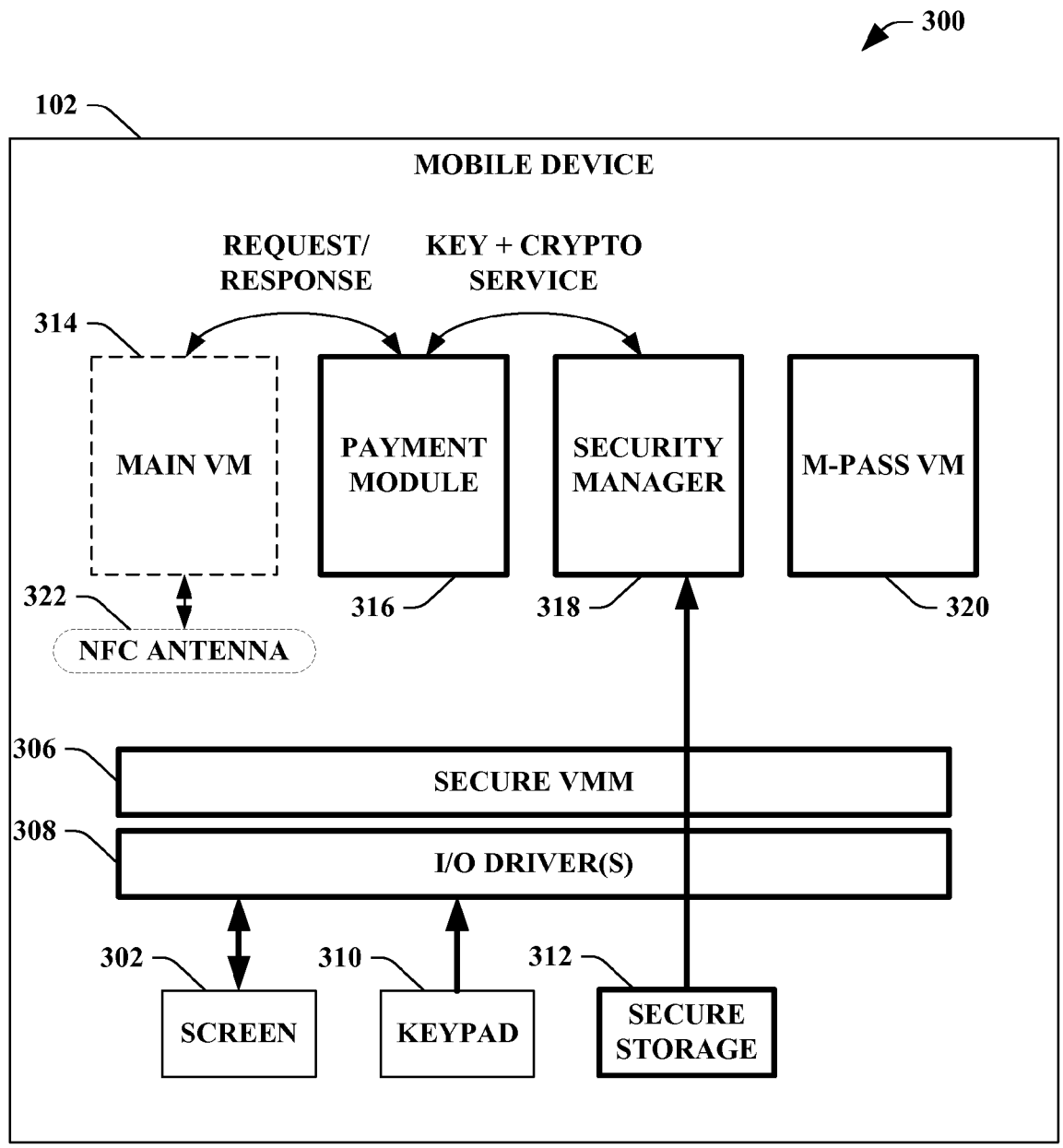
FIG. 3 illustrates a block diagram of an exemplary system that facilitates employing a secure payment protocol in connection with a mobile device and a terminal.

FIG. 3 illustrates a system 300 that facilitates employing a secure payment protocol in connection with a mobile device and a terminal. The system 300 can include the device 102 that can provide secure wireless digital payments to a terminal component (not shown) utilizing an m-card linked to an account. It is to be appreciated that the system 300 can include hardware and/or software that make attacks on the system 300 or the mobile device 102 fruitless and/or unprofitable. The system 300 depicts a particular architecture on the mobile device 102 (e.g., a payment-enabled device).

The system 300 can utilize a payment protocol in connection with the mobile device 102, wherein the mobile device 102 can include a secure screen 302 and some form of input mechanism. The screen 302 can be vital in that a user need not trust displayed data on the terminal component. In addition, many convenient features can be made possible with the screen 302. These include being able to select an m-card and to manage one's finance. A trustworthy input mechanism can also enable a user to authorize a transaction on the mobile device 102.

As discussed, it is to be appreciated that the mobile device 102 can be any suitable portable device that can wirelessly communicate and/or store an m-card. For example, the mobile device 102 can be a handheld, a portable digital assistant, a cellular device, a mobile communication device, a portable media player, a gaming device, a pocket PC, a smartphone, a dedicated payment device with a screen and input, a wearable item, a watch, a wrist band, a piece of jewelry (e.g., a ring, a necklace, a belt, etc.), a calculator, a translator, etc. It is to be appreciated that the described architecture in the system 200 can be utilized with any of the mentioned mobile devices 102.

The mobile device 102 can include the m-card which enables wireless digital payments. For example, the mobile device 102 with m-card information can be referred to as a mobile wallet, a cell phone wallet, and the like. The system 300 can include a version of Next-Generation Secure Computing Base (NGSCB). The system 300 can host a Type-I virtual machine environment, as illustrated in FIG. 3. The system 300 can include a secure virtual machine monitor (VMM) 306 with an I/O driver 308. The I/O driver 308 can include at least one driver for key devices such as the screen 302, a keypad 306 and a secure storage 308. It is to be appreciated that these special drivers can also be located in a separate virtual machine (VM) to reduce the size of VMM 306, at a cost of increased runtime overhead. On top of the secure VMM 306, there can be numerous VMs such as, but not limited to, a main VM 314, a payment module 316, a security manager 318, and/or an m-pass VM 320. The main VM 314 can assume a traditional role of a mobile device 102 operating system (OS). The main VM 314 can directly interact with a wireless network and with a payment terminal (e.g., the terminal component). The payment module 316 can be a VM that implements a payment module. The payment module can be strictly isolated from the system 300 in order to preserve integrity. The security manager 318 can be a VM that manages the secure storage 312 and a portion of the cryptographic services. The m-pass VM 320 can be utilized with managing passwords and password entry on behalf of the system 300 (e.g., See FIG. 4, FIG. 7, and FIG. 8 for more details).

In one example, the secure VMs (e.g., the main VM 314, the payment module 316, the security manager 318, and/or the m-pass VM 320) can run an operating system that is written in a safe language such as, but not limited to Singularity. It is to be appreciated that any suitable safe programming language can be utilized by the subject innovation. Moreover, the VMs can have access to the screen 302 and/or the keypad 310. For instance, the access can be granted on an exclusive basis. In one specific example, at any given time, only one VM can have the focus. Thus, following the example, the Main VM 314 can have the focus of the screen 302 and/or the keypad 310 but no other VM can have the attention during such time.

In one aspect in accordance with the claimed subject manner, the mobile device 102 can communicate with the terminal component (e.g., the payment terminal) via Near-Field Communication (NFC) with an NFC antenna 322. However, it is to be appreciated that the subject innovation can utilize any suitable wireless technique such as, but not limited to, Wi-Fi, Bluetooth, radio frequency identification (RFID), etc. In an NFC example, the mobile device 102 and the terminal component can be equipped with NFC antennas.

FIG. 3 depicts a trusted component with a thick-bordered box, whereas an un-trusted component is depicted with a dashed bordered box. Unlike NGSCB which is designed to be open to all operating systems, a typical mobile device 102 system can be vendor-specific and OS-specific. Therefore, the system 300 can use a secure boot mechanism as opposed to an authenticated boot found in NGSCB. A boot loader (not shown) can be burnt into a portion of firmware related to the mobile device 102. The boot loader can load a certified virtual machine monitor (VMM) 306, which then loads a pre-specified virtual machine (VM) image.

It is to be appreciated that the following operational characteristics can be employed by the mobile device 102: 1) the payment module 316 can authorize a transaction since it can access the necessary keys; and 2) the payment module 316 can have the screen 302 and the keypad 310 focus when active.

Furthermore, device-specific secrets, such as device keys for example, can be stored in a NGSCB-like sealed storage (e.g., the secure storage 312). A correct boot loader (hence VMM) can access such secrets. This can prevent a thief from stealing a secret by running a hacked version of system software on a stolen mobile device. Moreover, the trusted components are small enough and written in a safe language, such that attacks (e.g., buffer overrun, etc.) are quite rare. Therefore, the most viable way to obtain a secret from a stolen mobile device would be to hack the hardware. Protecting the hardware against those hackers without expensive instruments is well within the ability of the chip industry. For example, the techniques used in gaming consoles, wherein memory reads and writes on certain regions are encrypted, can be used to defeat hardware attacks (e.g., bus-snooping, etc.).

The mobile device 102 can further secure a location of the terminal component (e.g., the payment terminal) by leveraging global positioning services (GPS). The mobile device can check a location of the payment terminal (e.g., embedded in a terminal's certificate) against the mobile device location (e.g., obtains from a cell tower, obtained from an on-board GPS chip, etc.). With location matching, stealing a payment terminal and placing in a different location would be difficult.

Figure 4:
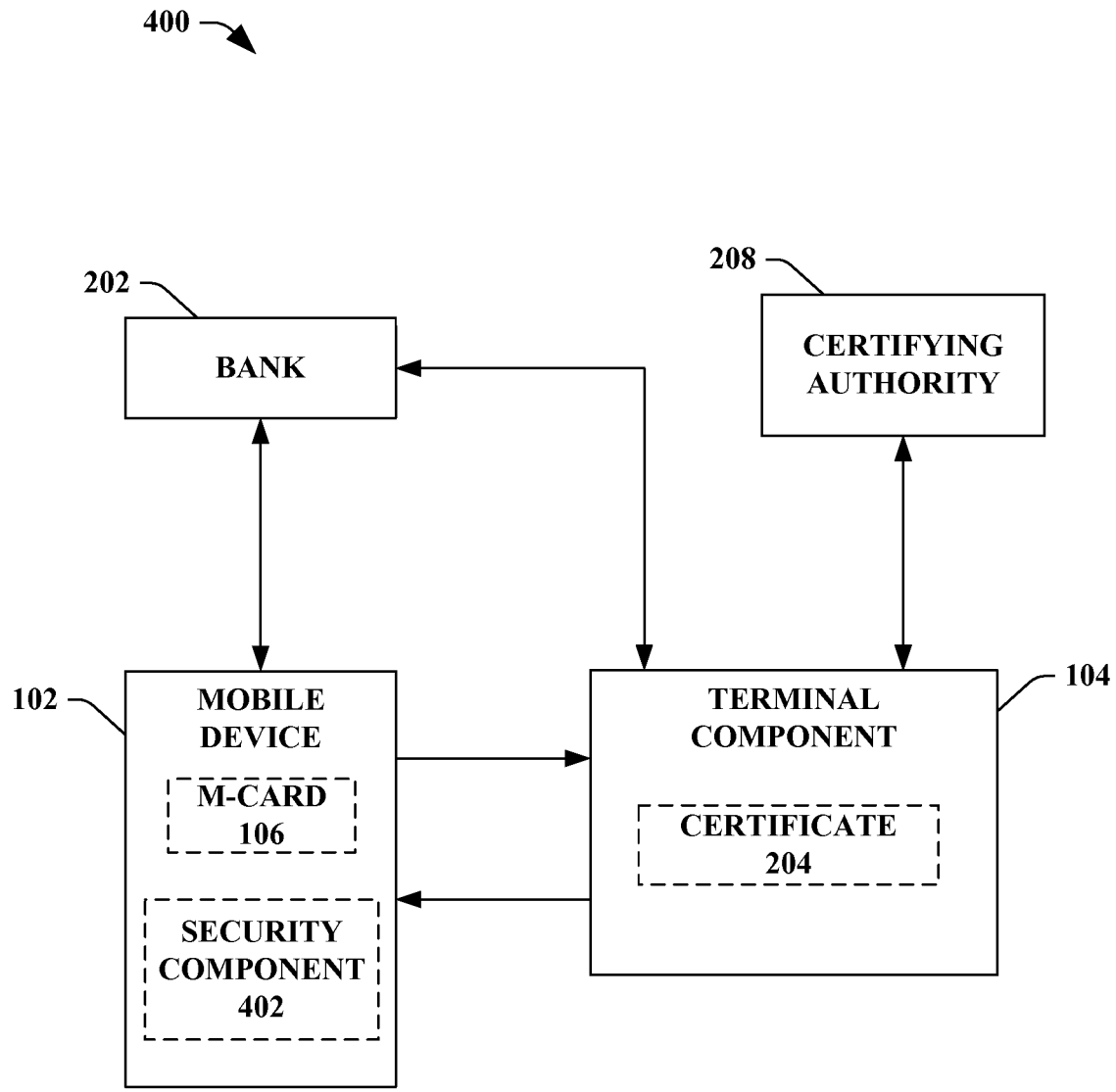
FIG. 4 illustrates a block diagram of an exemplary system that facilitates increasing mobile device security in connection with communicating wireless payments to a terminal.

FIG. 4 illustrates a system 400 that facilitates increasing mobile device security in connection with communicating wireless payments to a terminal. The system 400 can include the mobile device 102 that can employ the m-card 106 for wireless digital payments. In particular, the system 400 can utilize cryptography, process isolation (e.g., utilizing virtual machines), and safe-language runtime to minimize theft attacks, software attacks, and/or any other physical theft.

The mobile device 102 can further include a security component 402 that enhances security techniques in connection with a wireless digital payment between the mobile device 102 (e.g., communicating m-card data) with the terminal component 104. Both users and banks can be concerned about theft and misuse of a payment accounts associated with the m-card 106. The security component 402 provides various security measures and/or techniques which limit user inconvenience.

Generally, theft falls into two categories: physical theft of the mobile device 102 and remote software attacks via airborne viruses. In relation to physical theft of the mobile device 102, the threat is akin to that of theft of plastic cards (e.g., credit cards, debit cards, etc.) A user can report a loss to mobile device carriers and/or banks, wherein the carrier can hot-list a stolen mobile device and the bank can hot-list related accounts. Thus, for instance, the payment network can be centrally managed in which revocation can be effective immediately to stop further monetary loss. Hence, the system 400 can utilize an on-line clearing agent. In other words, the security component 402 can leverage an on-line clearing agent in order to automatically inform at least one of the bank 202, a mobile device service provider, and/or the certifying authority 208 of a stolen mobile device.

The security component 402 can further enable deletion of any m-card data in the event of a theft or threat. For instance, a user could protect the cell phone's payment module with a PIN number (or password) and data stored on the m-card can be deleted when tampering attempts (e.g., several unsuccessful entries of PIN, etc.) are detected. Moreover, the security component 402 can employ the PIN or password based on a monetary amount of the transactions (e.g., small transactions can be automatically implemented). In such example, an additional security measure can be employed by the security component 402. For instance, for small transactions, no user authentication may be required, yet the mobile device 102 can track transactions within a time period surrounding a recent user authentication. On each new transaction, the security component 402 within the mobile device 102 can determine whether a potential damage due to theft reaches a certain threshold. If so, a prompt can be provided by the security component 402 to the user to enter the PIN or password.

The security component 402 further provides safeguards against software and/or hardware hacking (e.g., hacking to retrieve a secret or portion of sensitive data related to an m-card, etc.). For instance, a software and/or hardware hack can attempt to bypass a user authentication (e.g., PIN, password, etc.) or to install a secret on a disparate mobile device for user impersonation. Thus, the security component 402 can provide hardware-based protection schemes that increase the cost of and the time required for hacking-thus, making such efforts unprofitable. In particular, the security component 402 can encrypt payment codes and/or data in mobile device storage. If the payment code and data are encrypted in the mobile device storage, a hacker will not be able to reverse engineer without breaking such hardware protection. Furthermore, if the payment code and data are obfuscated and individualized to each phone (e.g., such as a digital rights management technique), a hacker must spend a fair amount of time on each stolen phone even after successful bypass of the HW protection, thereby making it difficult to lower the amortized cost of breaking hardware/software (HW/SW) protection.

Since the main operating system (OS) on the mobile device 102 and the payment terminal (e.g., the terminal component 104) are un-trusted, an attacker can still trick a user into authorizing illegitimate transactions by compromising the main operating system on the mobile device 102 or the payment terminal (e.g., the terminal component 104). The security component 402 can utilize an effective fraud detection algorithm. Furthermore, it is therefore important that a user authorizes what is displayed or seen. The security component 402 can enhance security associated with securing I/O. Thus, the security component 402 can allow different virtual machines time-share a screen and a keypad associated with the mobile device 102. In other words, at any given time, one VM within the mobile device 102 can have the input focus and can write to the screen.

The security component 402 can further guard against a compromised main OS issuing an illegitimate transaction without the involvement of the terminal component 104 (e.g., a payment terminal). For instance, this type of attack becomes a possibility when the mobile device 102 enables automatic authorization of transactions (e.g., small transactions). For example, a user can simply wave the mobile device 102 at a subway turnstile to pay for a ride. A complete authorization sequence could be too cumbersome. With the automatic payment, the system 400 is very open to threats. For example, the main OS can be tricked to request payments on behalf of an illegitimate vendor without the user's knowledge.

The security component 402 can employ a physical button input on the mobile device 102, wherein the physical button input can initiate or confirm a payment. For example, when the user holds down the payment button, a single, small transaction can be allowed to go through without additional input from a user (e.g., a small payment to ride the subway). The payment button can be managed by the VMM (see FIG. 3) so that the main OS cannot guess when it is pressed and piggyback another transaction request. It is possible that the compromised main OS will submit another transaction along with the legitimate one when it detects that a communication channel has been established between the mobile device 102 and the terminal component 104 (e.g., a payment terminal such as the subway turnstile). Returning to the subway example, since only one transaction can go through with the payment button, either the spurious transaction is rejected or a user can notice a payment for something but still cannot get through the turnstile.

In another example, an attacker can obtain a user's PIN code (or password) using a remote software attack and then steal and use the mobile device 102 itself with the stolen PIN. To steal the PIN code, an attacker may compromise the main OS and then put up a Trojan screen that simulates a password entry screen used by the payment module, thereby tricking a user into revealing password (or PIN number). The security component 402 can prevent/mitigate a Trojan attack.

The security component 402 can provide a mitigation technique in which the VMM layer constantly monitors a user's keystrokes. Once a sequence of strokes that resemble an existing password is detected and the input is being directed to an un-trusted VM (e.g., the main OS), the security component 402 can enable the VMM to warn a user and ask for a confirmation before sending the keystrokes to the VM.

Figure 7:
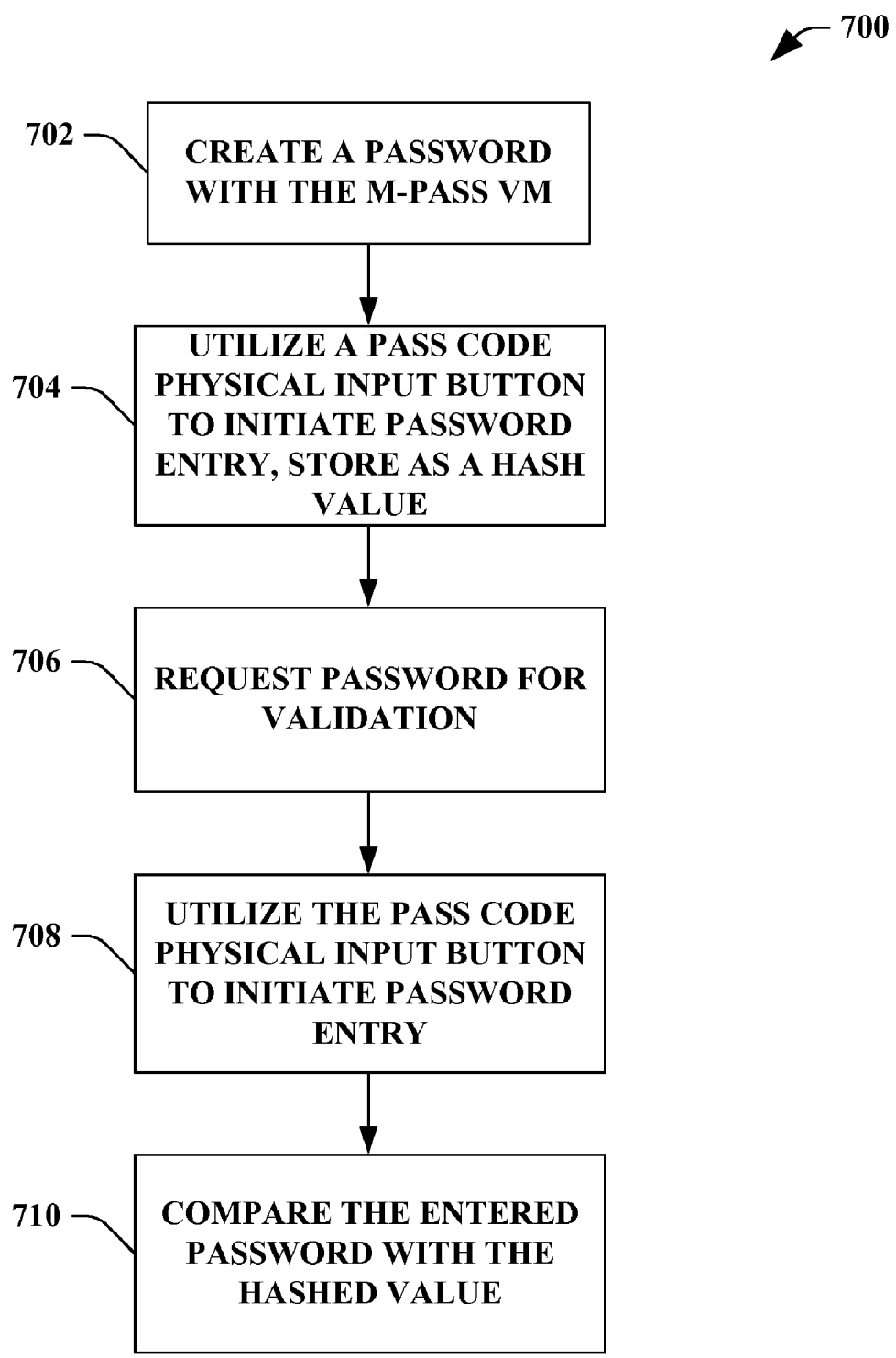
FIG. 7 illustrates an exemplary methodology for creating and validating a secure virtual machine (VM) managed password (M-Pass).
Figure 8:
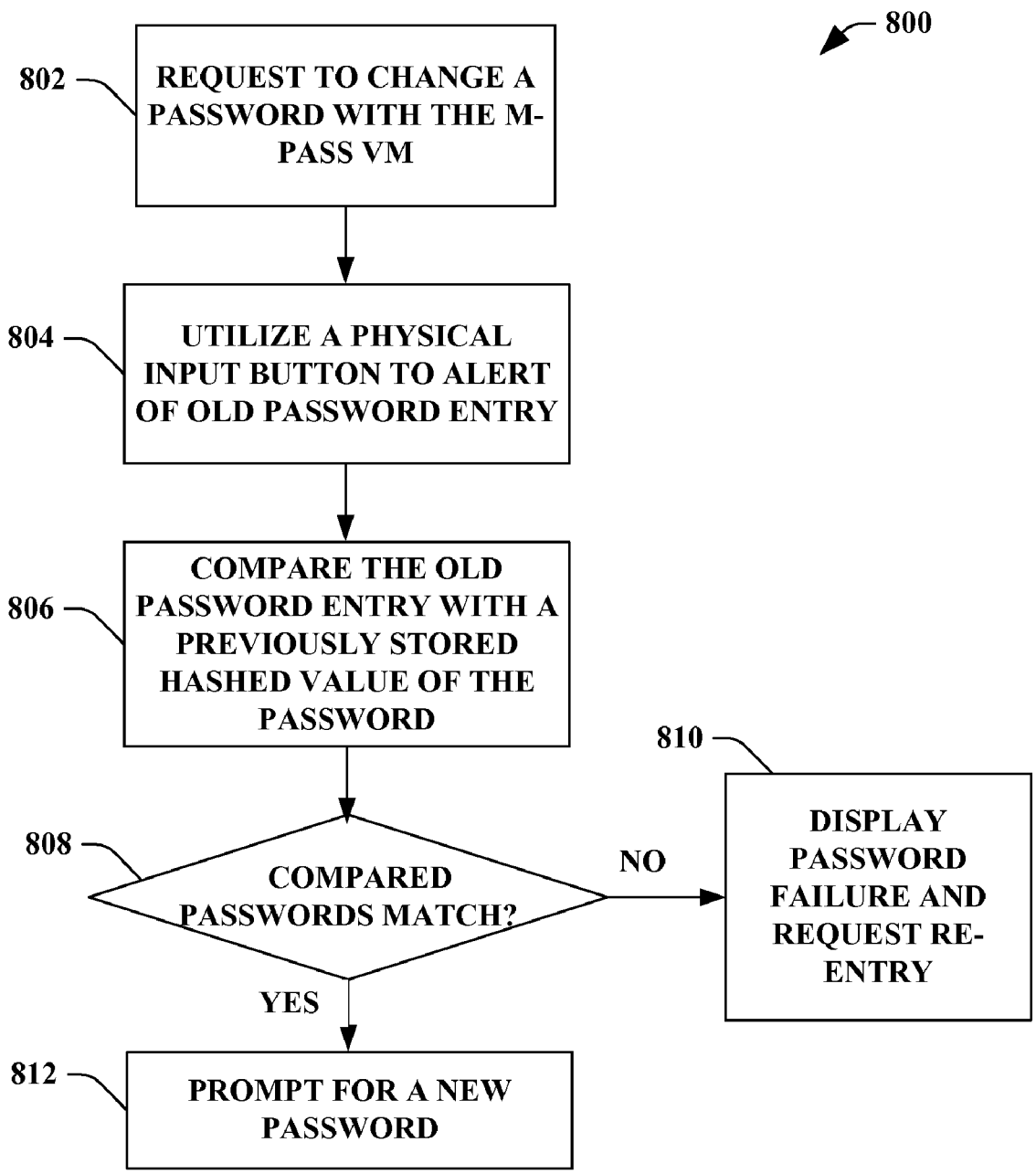
FIG. 8 illustrates an exemplary methodology that facilitates changing a virtual machine (VM) managed password (M-Pass).

The security component 402 can provide a preventative technique that utilizes a physical button input such as a pass code key input. For example, a user can announce to the system 400 of a password entry with the activation of the pass code key. The pass code key can be incorporated into the keypad or the mobile device 102. Activating the pass code key can notify the VMM that a password is going to be entered so that it can ensure that the VM receiving the input must be one of those trusted ones. As a further refinement of the pass code key mechanism, the security component 402 can allow processing of critical passwords to be left entirely to one of a dedicated VM or the VMM. FIG. 7 and FIG. 8 illustrate various aspects of the managed password mechanisms.

Figure 5:
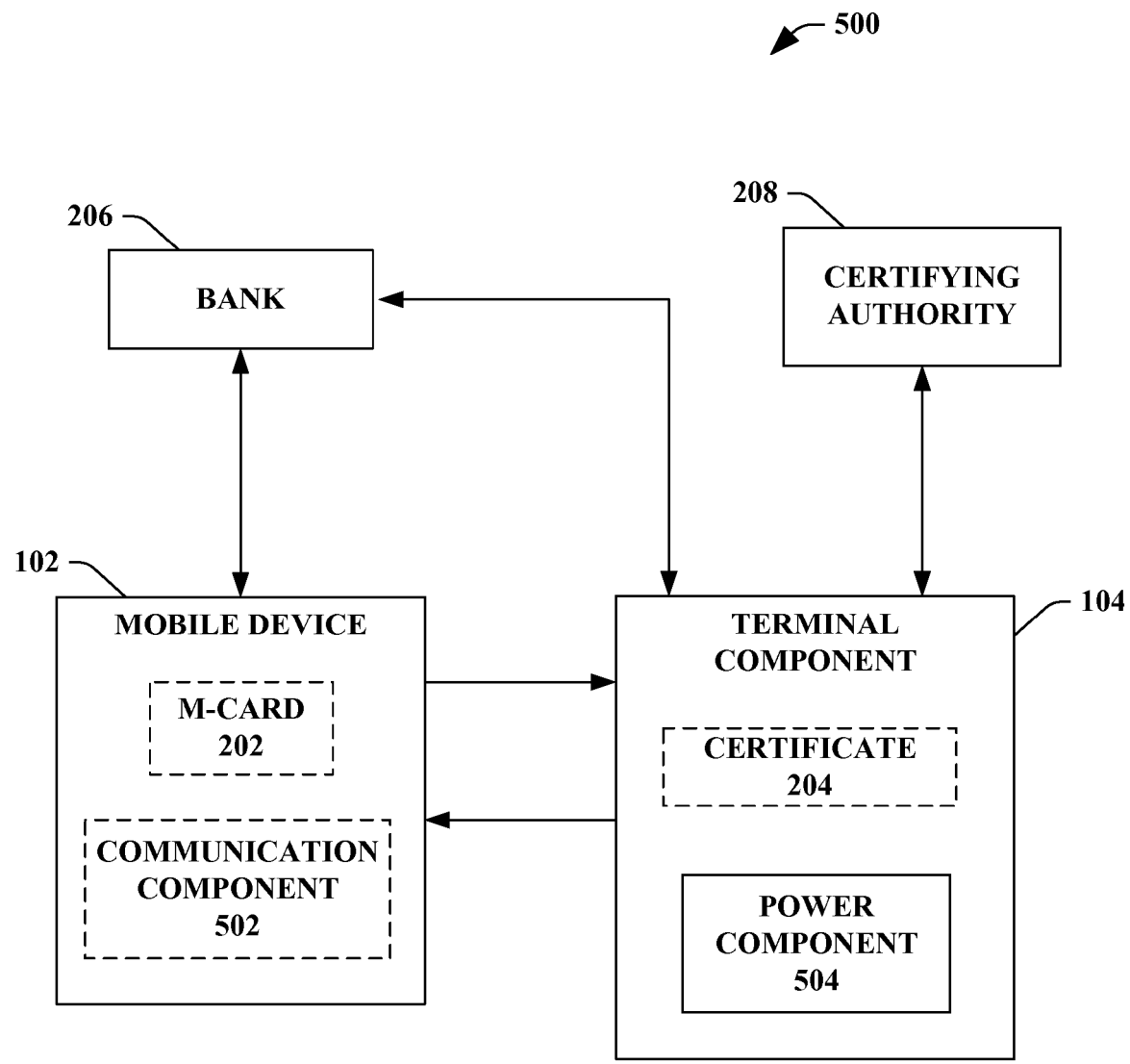
FIG. 5 illustrates a block diagram of exemplary system that facilitates wirelessly communicating sensitive data securely between a mobile device and a terminal.

FIG. 5 illustrates a system 500 that facilities wirelessly communicating sensitive data securely between a mobile device and a terminal. The system 500 can further include a communication component 502 that can employ wireless communication techniques in connection with the terminal component 104. For example, the communication component 502 can provide NFC, Bluetooth, RFID, Wi-Fi, and/or any other suitable wireless techniques or mechanisms for interaction with the terminal component 104.

The communication component 502 can utilize various wireless techniques, yet NFC and Bluetooth are exemplary techniques but the subject innovation is not to be so limited. For example, holding the mobile device 102 close to an NFC antenna for longer than a couple of seconds can be inconvenient. A complete authorization sequence including password entry can take longer than 20 seconds. Bluetooth, on the other hand, has a greater distance; but it is less secure and its device-discovery stage is slow. However, the communication component 502 can combine NFC and Bluetooth in a typical two-stage protocol. For example, a user first touches the mobile device 102 on an NFC antenna to establish a secret key pair; the keys are then used to establish a secure channel over Bluetooth. This combination offers both security and greater operating distance. As a side benefit, it also allows sharing of the terminal component 104 (e.g., a payment terminal) by multiple users. For example, at a ticket booth, each user quickly taps his phone on the terminal and then steps aside to review the ticket info and finalize the purchase. Additionally, a rogue Bluetooth antenna would not be able to obtain the secret communication key established in the NFC stage, and hence can neither hijack nor eavesdrop on the communication between the terminal component 104 and the mobile device 102.

The communication component 502 can further leverage a cellular network to provide an alternative (e.g., physical) communication path. Instead of using the terminal component 104 as an intermediary (e.g., phone↔terminal↔bank), the subject innovation can have pair-wise communication links such as phone ↔terminal, terminal↔bank, and phone ↔bank. In one example, a transaction can include the following: 1) the mobile device and the terminal establish a secure link and initiate a transaction; 2) the terminal forwards the transaction request to the bank; and 3) the bank contacts the mobile device separately to complete the transaction.

It is to be appreciated that the bank can handle the transaction by talking directly to the user. Although the use of the cellular network has an added security benefit that the user need not trust the link between the payment terminal and the bank, such a feature may not be cost-effective when the user is roaming outside his/her home calling area. In addition, the transport protocol, which uses the terminal to tunnel communication between the mobile device and the bank, accomplishes the same goal by using cryptography. In neither system can the merchant's terminal read or tamper with the user's payment credentials and transaction authorizations.

The system 500 can further utilize a power component 504 that leverage a wireless communication technique to generate power for the mobile device 102. Note that stringent security requirements necessitate use of a full-powered mobile device 102. For example, the power component 504 can provide a quick charge or drawing power at the terminal component 104. The payment module (see FIG. 3) can operate on low power due to the use of NFC. The amount of power consumption required to conduct a transaction should be comparatively small. Thus, the power component 504 can implement a quick charge or a power-supply probe. The former can give the mobile device 102 enough power to operate a full transaction cycle. The quick charge provided by the power component 504 can be combined with the NFC contact so that with a single touch, a user not only charges the mobile device 102 but also establishes a secure air link (e.g., NFC, NFC and Bluetooth, etc.) with the terminal component 104.

FIGS. 6-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 6 illustrates a method 600 that facilitates utilizing a mobile device to securely wirelessly transmit account information. At reference numeral 602, an m-card can be created and incorporated onto a mobile device. An m-card can be created by a user with options from at least one of the mobile device, a bank, an account, a credit card company, and the like. The m-card can be linked to an account associated with a bank, wherein such can be stored on any suitable mobile device such as a handheld, a portable digital assistant (PDA), a gaming device, a portable media player, a pocket PC, a cellular device, etc. Moreover, the mobile device can utilize a wireless communication technique in order to interact with a payment terminal. At reference numeral 604, a certificate can be issued to a terminal or a payment terminal in order to verify validity. For example, a certifying authority (e.g., a third-party, a bank, etc.) can examine, monitor, and/or maintain terminal integrity with a time-stamped certificate signifying the terminal is secure.

At reference numeral 606, a determination is made whether a transaction with a terminal is to be initiated. If a transaction is not initiated, the methodology 600 can return to reference numeral 606 in order to await an initiation of a transaction between the mobile device and the terminal. If a transaction is to be initiated, the methodology 600 continues at reference numeral 608. A transaction can be initiated when a mobile device comes within a particular distance (e.g., defined by a range of wireless communication utilized by at least one of the mobile device or the terminal) with a payment terminal. Moreover, upon initiation of the transaction, a portion of transactional data can be communicated to the mobile device utilizing public-key cryptography (e.g., price, location, etc.) In one example, the mobile device can include a physical input button that can activate a payment mode. Thus, when within a range of a terminal, the physical input button can be activated to initiate a transaction with the terminal.

At reference numeral 608, at least one of the certificate or the m-card can be validated. The m-card and/or the certificate can be transmitted utilizing public-key cryptography, therefore providing a secure communication channel. For example, the m-card can be communicated to the terminal, wherein the terminal can verify such information via a bank or other entity associated with the linked account or m-card provider (utilizing an encryption for data transmissions). Upon verification, the bank can provide confirmation to the terminal. In addition, the certificate associated with the terminal can be verified via at least one of the mobile device (e.g., matching physical location of the terminal with mobile device GPS, cell tower triangulation techniques, etc.), a certifying authority (e.g., independent entity), or a bank. At reference numeral 610, a transaction can be processed with the m-card information. Once confirmation is received from the terminal via the bank, the transaction can be completed with a confirmation to the mobile device, wherein the mobile device can record the transaction.

The following is an example of a secure transaction in accordance with the subject innovation. Payer's phone P contacts a payment terminal T to initiate a transaction. A secure channel is set up using a standard key-exchange protocol. T transmits the following information to the phone: transaction details δ and the amount π, encrypted with (or signed by) T.K$_s$. The terminal T also sends to the phone its cryptographic signature so that the latter can verify the authenticity of T.K$_p$ and use it to decrypt (verify) the transaction details. The phone prompts the user to authorize the transaction. The user picks an m-card and authorizes the transaction.

Once the transaction is authorized by the user, a user-authorization packet is sent to T. The packet includes the following items: the m-card number M.N, the terminal ID T.N, the terminal certificate T.C, δ and π. All these items are signed with the m-card's secret key, M.K$_s$. T passes the user-authorization packet to the bank for authorization. The communication between the terminal and the bank is of course encrypted. T may also attach a signature generated by its secret key T.Ks so that the bank can also verify the authenticity of the terminal. Note that the packet can be signed by the m-card's secret key so that the terminal cannot alter the transaction amount. The bank looks up the m-card's public key M.K$_p$ by its card number M.N. It then uses the public key to verify the information contained in the user-authorization packet. Once the bank approves the transaction, it sends back a confirmation to the terminal. The latter then informs the user's phone of transaction completion. The phone records the transaction.

FIG. 7 illustrates a method 700 that facilitates creating and validating a secure virtual machine (VM) managed password (m-pass). The method 700 illustrates employment of a centrally managed password technique utilized by the subject innovation. For instance, passwords that can be centrally managed by a secure virtual machine (VM) can be referred to as managed passwords (e.g., m-pass). The secure VM managing the passwords can be, for instance, an m-pass VM (See FIG. 3). Each m-pass can be tagged by a string, for example, "BankA Login." The method 700 illustrates techniques on creation and validation of an m-pass.

At reference numeral 702, a password can be created with the m-pass virtual machine. In particular, the m-pass VM can be called (by the VM) with a tag string to create the password. Once called, the m-pass VM can prompt a user to enter a new password. At reference numeral 704, a pass code physical input button can be utilized to initiate a password entry and such password can be stored as a hash value. For instance, a user can activate the pass code input button and enter keystrokes related to a password. Upon completion of the password entry, the pass code input button (e.g., or any other suitable button such as an enter button) can be activated again to signify the completion of password entry. The keystrokes received between the two input button activations by the m-pass VM can be stored as a hash value.

Continuing at reference numeral 706, a password can be requested for validation. It is to be appreciated that the password request can be initiated at any suitable time such as, but not limited to, prior to a transaction, during a transaction, after a transaction, after a pre-defined number of transactions, after a dollar amount of tabulated transactions, upon detection of a possible threat, etc. In particular, the m-pass VM can be called (by the VM) with a tag string to validate the password. Once called, the m-pass VM can prompt a user to enter a password.

At reference numeral 708, the pass code physical input button can be utilized to initiate a password entry for validation. For instance, the pass code input button can be activated to initiate or alert the mobile device that a password is going to be entered. A user can activate the pass code input button (initiate password entry) followed by the password and then activate an input button (alert of password entry completion), wherein the input button can be any suitable button (e.g., the pass code input, enter input, etc.). The keystrokes entered between the pass code input button and the input button can be communicated to the m-pass VM. At reference numeral 710, the password entered can be compared with the hash value in order to verify accuracy. If the password is entered correctly, the validation has succeeded; whereas if the password is entered incorrectly, the validation has failed.

FIG. 8 illustrates a method 800 for changing a virtual machine (VM) managed password (M-Pass). The method 800 relates to changing a managed password (m-pass) associated with the m-pass VM. It is to be appreciated that the method 800 relates to changing an existing m-pass created (described in FIG. 7). At reference numeral 802, a request can be made to change a password with the m-pass VM. In particular, a virtual machine (VM) can call the m-pass VM with a tag sting to change the password. The m-pass VM can prompt a user to enter an old password. At reference numeral 804, a physical input button can be utilized to alert of a password entry (e.g., here the alert relates to entering an old password). For instance, the user can activate the pass code physical input button followed by the old password, and then another input button to signal completion of password entry. The keystrokes between the pass code input button activation and the other input button can be transmitted to the m-pass VM.

At reference numeral 806, the old password entry can be compared with a previously stored hashed value of the password for authentication. At reference numeral 808, a determination is made whether the comparison is a match. If the comparison is not a match, the method 800 continues at reference numeral 810, where a password failure and request for re-entry is displayed. If the comparison is a match, the method 800 continues to reference numeral 812, where a prompt for a new password can be employed.

Figure 9:
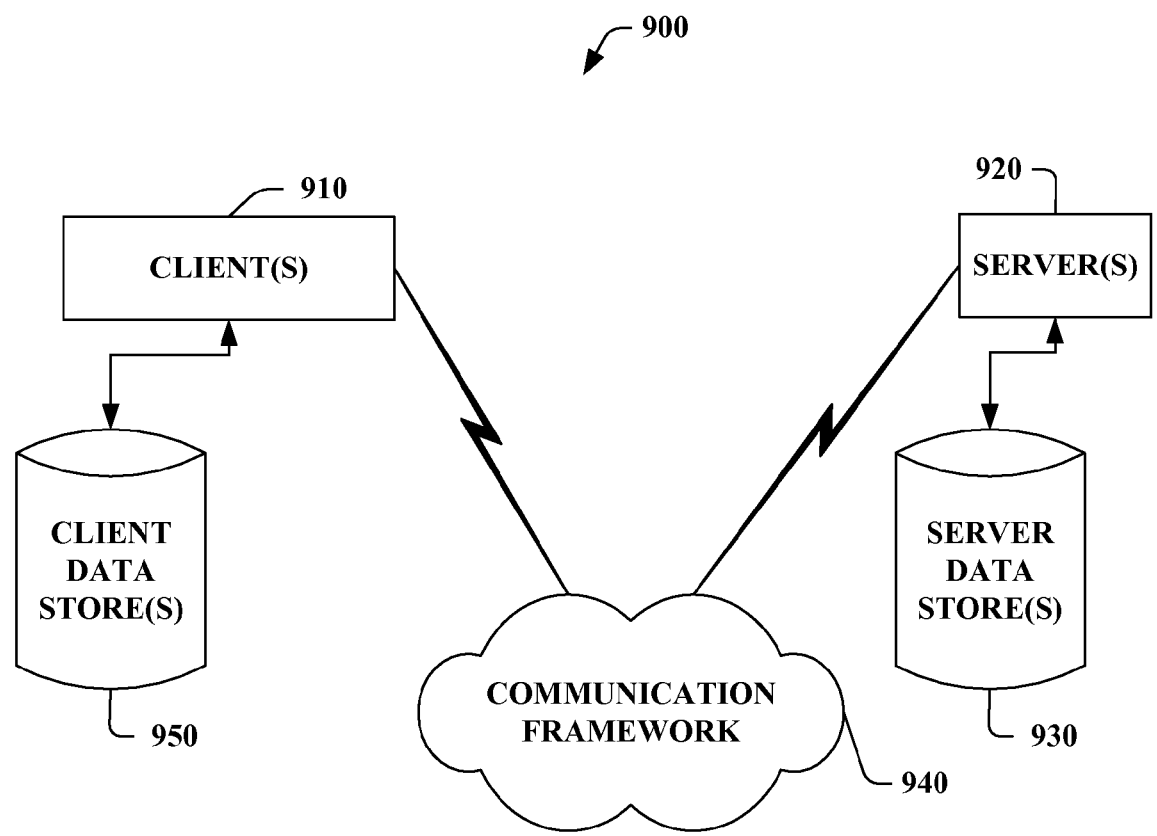
FIG. 9 illustrates an exemplary networking environment, wherein the novel aspects of the claimed subject matter can be employed.
Figure 10:
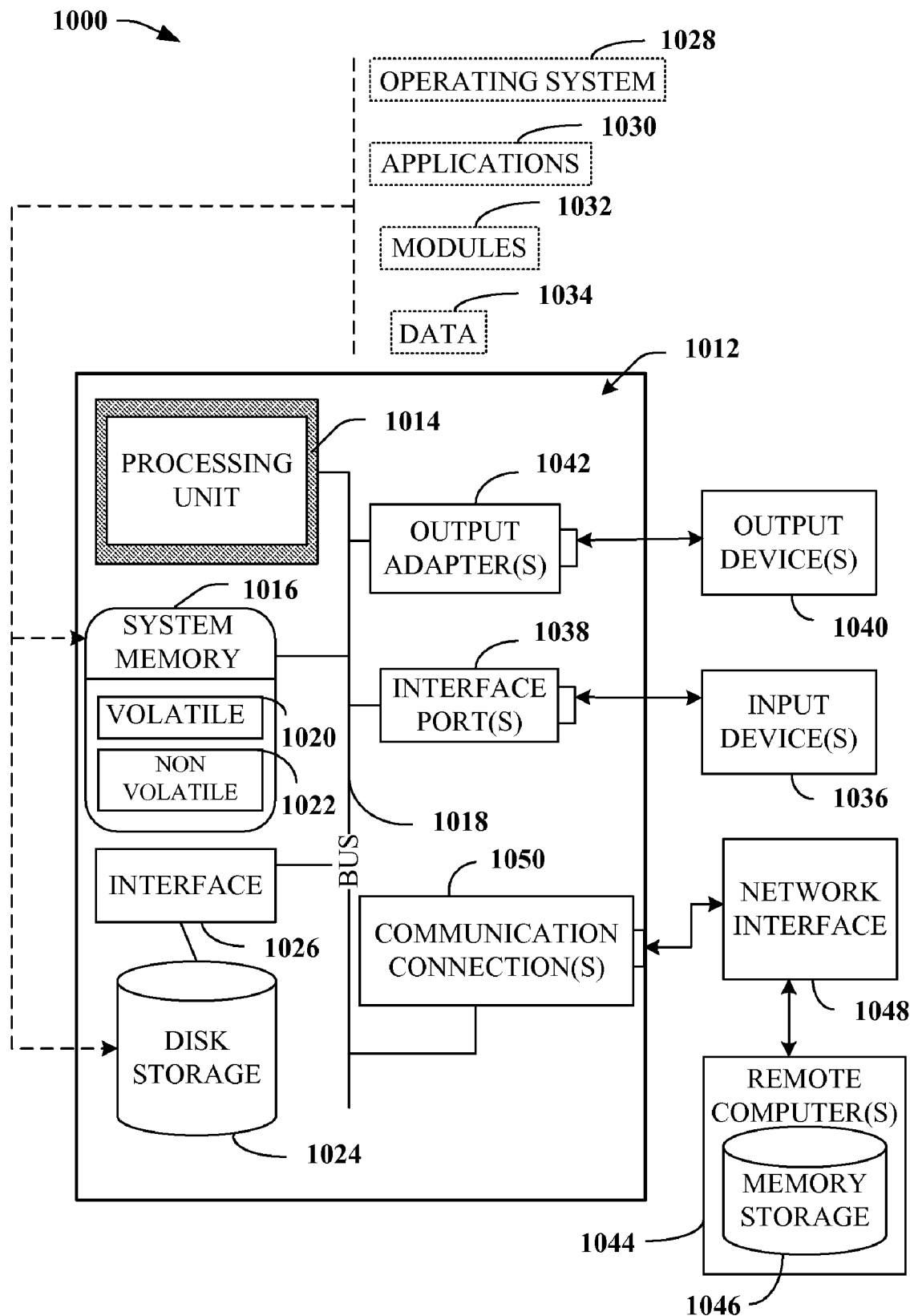
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a mobile device that can incorporate an m-card to initiate a secured wireless transaction with a terminal by employing a secure payment protocol, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented system that facilitates securing a wireless digital transaction, comprising:
    a terminal component receives a portion of data related to a payment for at least one of a good or a service;
    a mobile device that includes at least one mobile payment card (m-card), the m-card is created by establishing a link to an account associated with a form of currency; and
    the mobile device employs public-key cryptography (PKC) to securely and wirelessly transmit a payment to the terminal component utilizing the m-card and linked account;
    the mobile device hosts a virtual machine (VM) environment that includes a secure virtual machine monitor (VMM) that monitors at least a main VM and an isolated payment module VM, the VMM utilizes an I/O driver that provides a driver for at least one of a screen on the mobile device, a keypad on the mobile device, or a secure storage with hardware-based encryption related to a portion of data stored thereon, the main VM provides an operating system for the mobile device and wirelessly interacts with at least one of a wireless service provider network or the terminal component, the isolated payment module VM communicates at least one of a request or a response with the main VM.

2. The system of claim 1, the form of currency is cash, credit, a micro-payment, a pre-paid card, a stored value card, a disposable card, a line of credit, an exchange of a service, an exchange of a good, or a tab.

3. The system of claim 1, the mobile device communicates with the terminal component with at least one of near field communication (NFC), Bluetooth, wireless fidelity (Wi-Fi), or radio frequency identification (RFID).

4. The system of claim 1, the account is associated with at least one of a bank, a credit card company, an investment fund, an online brokerage, a web site, a business, a company, or a financial institution.

5. The system of claim 1, further comprising a certifying authority that is an independent organization that validates the terminal component by issuing a certificate with an expiration date.

6. The system of claim 1, the mobile device utilizes a next-generation secure computing base (NGSCB) with a secure boot mechanism.

7. The system of claim 1, further comprising a security manager VM that manages at least one of the secure storage or a portion of the public-key cryptography service.

8. The system of claim 7, further comprising an m-pass VM that manages at least one of a password or a personal identification number (PIN) related to the mobile device.

9. The system of claim 8, the mobile device implements at least one of the following:
- a limit to access to the screen and the keypad to a single virtual machine at a time; or
- a verification of a location of the terminal component by leveraging at least one of a global positioning service (GPS) on the mobile device or a cellular triangulation technique for the mobile device to identify a location of the mobile device, the location of the mobile device is compared to the location of the terminal component.

10. The system of claim 1, further comprising a security component that protects against a threat with at least one of the following:
- the security component leverages an online clearing agent to alert at least one of a bank, the account, a mobile device service provider, a certifying authority, or the terminal component of a theft related to at least one of a portion of data on the mobile device, the mobile device, or the terminal component;
- the security component deletes a portion of the m-card based on a security breach, the security breach is an invalid password entry, a defined number of incorrect password entry attempts, or received alert from the online clearing agent; or
- the security component employs a password during at least one of a moment prior to a transaction, a moment during a transaction, a moment after a transaction, a moment after a pre-defined number of transactions, a moment after a dollar amount of tabulated transactions, or a detection of a possible threat.

11. The system of claim 1, the mobile device further comprising at least one physical button input that, upon activation, initiates at least one of a password entry, a password entry completion, or a wireless digital payment to the terminal.

12. The system of claim 1, further comprising a communication component that enables wireless communication between the mobile device and the terminal component, the wireless communication is at least one of a NFC, Bluetooth, Wi-Fi, RFID, or a combination of NFC and Bluetooth in a two-stage protocol.

13. The system of claim 1, the terminal component further comprises a power component that transmits a portion of power to the mobile device during wireless communication, the portion of power is at least one of a quick charge or a power-supply probe.

14. A computer-implemented method that facilitates securely transmitting sensitive data related to a payment transaction, comprising:
- creating an m-card on a mobile device, the m-card includes a portion of account data associated with an account;
- storing the m-card on the mobile device;
- transmitting the portion of account data wirelessly to a payment terminal with public-key cryptography;
- verifying the portion of account data on the m-card with an organization corresponding to the account;
- processing a transaction with the portion of account data on the m-card upon verification from the account; and
- hosting a virtual machine (VM) environment within the mobile device that includes a secure virtual machine monitor (VMM) that monitors at least a main VM and an isolated payment module VM, the VMM utilizes an I/O driver that provides a driver for at least one of a screen on the mobile device, a keypad on the mobile device, or a secure storage with hardware-based encryption related to a portion of data stored thereon, the main VM provides an operating system for the mobile device and wirelessly interacts with at least one of a wireless service provider network or the payment terminal, the isolated payment module VM communicates at least one of a request or a response with the main VM.

15. The method of claim 14, further comprising:
- employing a next-generation secure computing base (NG-SCB) with a secure boot mechanism; and
- limiting interaction with a keypad and a screen on the mobile device to a single virtual machine.

16. The method of claim 14, further comprising:
- utilizing a physical button input on the mobile device to signal at least one of a password entry, a password entry completion, or an initiation of a wireless digital payment;
- authenticating the payment terminal with a certificate issued by an independent organization; or
- comparing a location related to the mobile device with a location of the payment terminal to authenticate the payment terminal.

17. A computer-implemented system that facilitates securing a wireless digital transaction, comprising:
- means for wirelessly receiving a portion of data related to a payment for at least one of a good or a service;
- means for creating a mobile payment card (m-card) on a mobile device;
- means for incorporating the m-card on the mobile device;
- means for linking the m-card to an account associated with a form of currency;
- means for wirelessly communicating a portion of the m-card to a payment terminal for a digital payment;
- means for securing the wireless communication with public-key cryptography; and
- means for hosting a virtual machine (VM) environment within the mobile device that includes a secure virtual machine monitor (VMM) that monitors at least a main VM and an isolated payment module VM, the VMM utilizes an I/O driver that provides a driver for at least one of a screen on the mobile device, a keypad on the mobile device, or a secure storage with hardware-based encryption related to a portion of data stored thereon, the main VM provides an operating system for the mobile device and wirelessly interacts with at least one of a wireless service provider network or the payment terminal, the isolated payment module VM communicates at least one of a request or a response with the main VM.

* * * * *